United States Patent
Yamamoto (10) Patent No.: US 7,184,587 B2
(45) Date of Patent: Feb. 27, 2007

(54) THREE-DIMENSIONAL SHAPE CREATING PROGRAM, THREE-DIMENSIONAL SHAPE CREATING METHOD, THREE-DIMENSIONAL SHAPE CREATING APPARATUS, AND COMPUTER READABLE RECORDING MEDIUM RECORDED WITH THREE-DIMENSIONAL SHAPE CREATING PROGRAM

(75) Inventor: Takashi Yamamoto, Shizuoka (JP)

(73) Assignee: Fujitsu Limited, Kawasaki (JP)

( * ) Notice: Subject to any disclaimer, the term of this patent is extended or adjusted under 35 U.S.C. 154(b) by 752 days.

(21) Appl. No.: 10/286,825

(22) Filed: Nov. 4, 2002

(65) Prior Publication Data

US 2003/0184542 A1    Oct. 2, 2003

(30) Foreign Application Priority Data

Mar. 29, 2002    (JP)    ............................. 2002-097256

(51) Int. Cl.
  G06K 9/00    (2006.01)
  G06T 15/00    (2006.01)
  G06F 19/00    (2006.01)
  G06F 7/66    (2006.01)

(52) U.S. Cl. ...................... 382/154; 345/419; 700/118; 700/196

(58) Field of Classification Search ................ 382/154; 345/419; 700/118, 180, 182–183, 196
See application file for complete search history.

(56) References Cited

U.S. PATENT DOCUMENTS

| 4,901,253 | A  | * | 2/1990  | Iwano et al. ............... 345/419 |
| 6,219,055 | B1 | * | 4/2001  | Bhargava et al. ............ 715/850 |
| 6,326,972 | B1 | * | 12/2001 | Buhler et al. ............... 345/474 |
| 6,392,645 | B1 | * | 5/2002  | Han et al. ................... 345/420 |
| 6,549,201 | B1 | * | 4/2003  | Igarashi et al. ............. 345/423 |
| 6,828,963 | B1 | * | 12/2004 | Rappoport .................. 345/419 |
| 6,839,606 | B2 | * | 1/2005  | Landers et al. ............. 700/159 |
| 6,847,384 | B1 | * | 1/2005  | Sabadell et al. ............ 345/672 |

OTHER PUBLICATIONS

Manual for Soldiworks Education Edition "Solidworks Education Edition Getting Started", 1995.*
SolidWorks 98, Training Manual, Parts, Assemblies and Drawigs. Vol. 1 and 2, 1998.*
Jianguang, S., Kaining G., Yulin G., and Zesheng T., "Technical Summaries of Gems", Journal of Computer Science and Technology, vol. 4, pp. 374-382, 1989.*
Rogers, G. "Dynamic 3D Modelling for Architectural Design", Computer Aided Design, vol. 12, No. 1, pp. 13-20, 1980.*
Omura G., "Mastering AutoCAD Release 12", 1992.*

* cited by examiner

Primary Examiner—Bhavesh M. Mehta
Assistant Examiner—Utpal Shah
(74) Attorney, Agent, or Firm—Staas & Halsey LLP (57) ABSTRACT

A three-dimensional shape creating program, a three-dimensional shape creating method, a three-dimensional shape creating apparatus and a computer readable recording medium recorded with the three-dimensional shape creating program, wherein one feature is made up of a plurality of loops with the contour lines thereof not crossed with one another, and an arbitrary extrusion size can be input for each of the loops, thereby improving the working efficiency for creating a three-dimensional shape.

15 Claims, 7 Drawing Sheets

DESIGNATE ADDITION SURFACE

(B)

(C)

(D)

A=0
B=40

(E)

REFERENCE SURFACE
40

| | LOOP | SIZE |
|---|---|---|
| 1 | A | 0 |
| 2 | A | a |
| 3 | B | 0 |
| 4 | B | b |

| | LOOP | SIZE |
|---|---|---|
| 1 | A | 0 |
| 2 | A | a |
| 3 | B | a |
| 4 | B | b |

|   | LOOP | SIZE |
|---|------|------|
| 1 | A    | 0    |
| 2 | B    | b    |

| | LOOP | SIZE | |
|---|---|---|---|
| 1 | A | 0 | |
| 2 | B | a | |
| 3 | B | a | CAN BE OMITTED |
| 4 | B | b | |

THREE-DIMENSIONAL SHAPE CREATING PROGRAM, THREE-DIMENSIONAL SHAPE CREATING METHOD, THREE-DIMENSIONAL SHAPE CREATING APPARATUS, AND COMPUTER READABLE RECORDING MEDIUM RECORDED WITH THREE-DIMENSIONAL SHAPE CREATING PROGRAM

BACKGROUND OF THE INVENTION

1. Field of the Invention

The present invention relates to a CAD (Computer Aided Design) system for designing a three-dimensional shape.

2. Description of the Related Art

In recent years, a CAD system for using a computer to design industrial products and buildings has been widely used in order to shorten the time for designing and improve the design quality. In many three-dimensional CAD systems, there have been employed a method of processing a model in units of shape feature, such as protrusion, holes and the like. Also, many of the three-dimensional CAD system include "a feature parametric function" capable of changing a shape easily by changing parameters that define the feature. In many three-dimensional CAD systems equipped with the feature parametric function, the feature constitutes a unit formed in a single drawing and also a unit to be subjected to edition such as subsequent deletion or change of order in creating history.

In the three-dimensional CAD system having the feature parametric function, the shape of a tap hole (stepped hole), for example, can be created by any one of following three methods. Namely, in a first method, a hole having a depth "a" is formed, and also a hole having a depth "b" from the bottom surface of the hole having the depth "a" is formed, to create the shape of the tap hole. In a second method, one half of the shape of the longitudinal section of a tap hole is rotated by 360 degrees to create the shape of the tap hole. A third method uses exclusive commands for creating a tap hole.

However, according to these methods, there has been caused the following problems. Namely, in the first method, the tap hole is created with two holes, and therefore configured of two features. Thus, subsequent editing operation is not easy. In the second method, a longitudinal sectional view of the tap hole is required. Therefore, in the case where only a plan view taken from just above the tap hole is available, a longitudinal sectional view is required to be prepared anew. The third method lacks flexibility, since the exclusive commands can create only a predetermined shape. Thus, the working efficiency of creating a three-dimensional shape is not so high.

In view of these conventional problems, an object of the present invention is to provide a technique for creating a three-dimensional shape, in which one feature is configured based on a plurality of loops with the contour lines thereof not crossed with one another, while at the same time making it possible to input an arbitrary extrusion size for each of the loops, thereby improving the working efficiency for creating the three-dimensional shape.

SUMMARY OF THE INVENTION

In order to achieve the object described above, according to the present invention, there is provided a technique for creating a three-dimensional shape, wherein a section including a plurality of loops having contour lines not crossed with one another is formed, an arbitrary size is input for extruding each of the loops in a predetermined direction, and each of the loops is extruded in the predetermined direction based on the input size, to thereby create a three-dimensional shape. At this time, the section is desirably made up by various primitives for adding one feature with a basic feature as a main.

With this constitution, an arbitrary size is input for extruding, in a predetermined direction, each of the loops having contour lines not crossed with one another from among various primitives making up a section for adding one feature. Based on the size thus input, each of the loops is extruded in the predetermined direction thereby to create a three-dimensional shape. As a result, the section is formed from a plurality of loops with the contour lines thereof not crossed with one another, and based on the section, one feature is created. In the editing operation including the deletion of the feature or the change of order in creating history, therefore, an object of edition can be easily selected. Also, since no longitudinal sectional view is used for creating a feature, the labor required for creating the longitudinal sectional view is eliminated. Further, in a common section, completely different features can be created by inputting different sizes for the loops making up the common section. Therefore, it is unnecessary to form different features by switching exclusive command each time. Thus, the working efficiency for creating a three-dimensional shape can be improved.

At this time, if each of the loops making up the section is notified to an operator, the operator can recognize that the size input is possible, thereby enabling to further improve the working efficiency.

On the other hand, in the case where one loop is contained in the other loop and also a size is designated for each loop, it is desirable to judge characteristics of the designation, to determine how a plurality of the loops are connected into a three-dimensional shape. Specifically, in the case where one loop is contained in the other loop and also extrusion amounts of both of the two loops are set to zero, it is desirable to execute a lofting process for connecting the contour lines of the two loops.

According to this constitution, in the case where one loop is contained in the other loop and also the size is designated for each loop, various three-dimensional shapes can be created by connecting the plurality of loops in accordance with the characteristics of the designation. Especially in the case where one loop is contained in the other loop and the extrusion amounts of both of the two loops both are set to zero, it is possible to easily create a taper portion as the feature by executing the lofting process.

Further, for the size of loop, it is desirable to input an extrusion start position with respect to a reference surface and the extrusion amount of the loop. Thus, the feature can be changed easily and flexibly by setting the loop extrusion start position and the loop extrusion amount arbitrarily.

In addition, it is desirable that a plurality of sizes can be input for the same loop. In this way, a feature having a plurality of characteristics, such as countersink or the like, can be easily created.

The above and other objects, features and advantages will become apparent from the following description of embodiments with reference to the accompanying drawings.

DESCRIPTION OF THE PREFERRED EMBODIMENTS

The present invention will be described in detail below with reference to the accompanying drawings.

Figure 1:
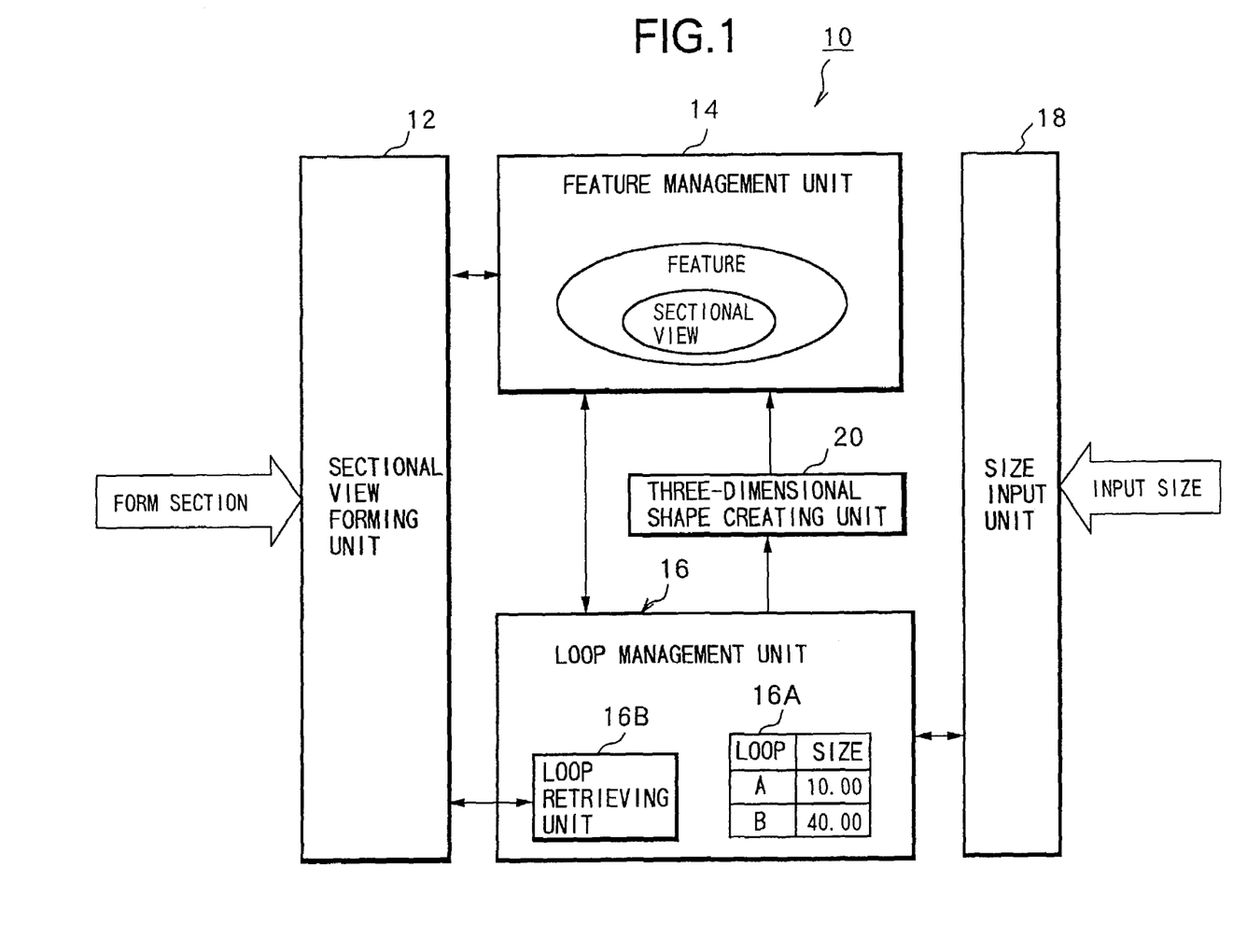
FIG. 1 is a diagram showing a configuration of a three-dimensional shape creating apparatus embodying the present invention.

FIG. 1 shows a configuration of a three-dimensional shape creating apparatus embodying the present invention. A three-dimensional shape creating apparatus 10 is constituted of a computer including at least a central processing unit (CPU) and a memory, in which various functions for creating a three-dimensional shape are realized by a program loaded in the memory. The three-dimensional shape creating apparatus 10 comprises a sectional view forming unit 12, a feature management unit 14, a loop management unit 16, a size input unit 18 and a three-dimensional shape creating unit 20.

In the sectional view forming unit 12, a sectional view including various primitives for adding a feature such as a protrusion or a hole is prepared using a feature making up a base of a model (hereinafter referred to as "the basic feature") as a main base. The feature management unit 14 manages the sectional view prepared by the sectional view forming unit 12 and a feature constructed of the sectional view. In the loop management unit 16, a loop making up a sectional view is managed by a management table 16A in which sizes of respective loops making up the sectional view are set, and by a loop retrieving unit 16B retrieving a plurality of loops making up the sectional view. The "loop" is a primitive with the contour lines thereof not crossed, which serves as a basis for constituting a feature. The loop retrieving unit 16B also has a function for notifying an operator (designer) of a loop retrieved. In the size input unit 18, sizes are input for creating a three-dimensional shape by extruding in a predetermined direction each loop retrieved by the loop retrieving unit 16B. In the three-dimensional shape creating unit 20, each loop making up the sectional view is extruded in a predetermined direction based on the sizes input by the size input unit 18, to thereby create a three-dimensional shape.

The sectional view forming unit 12, the loop retrieving unit 16B, the size input nit 18 and the three-dimensional shape creating unit 20 realize, in software manner, a section forming step and section forming means, a loop notifying step, a size input step and size input means, and a a three-dimensional shape creating step and three-dimensional shape creating means, respectively.

Next, the operation of this three-dimensional shape creating apparatus 10 will be described.

Figure 2:
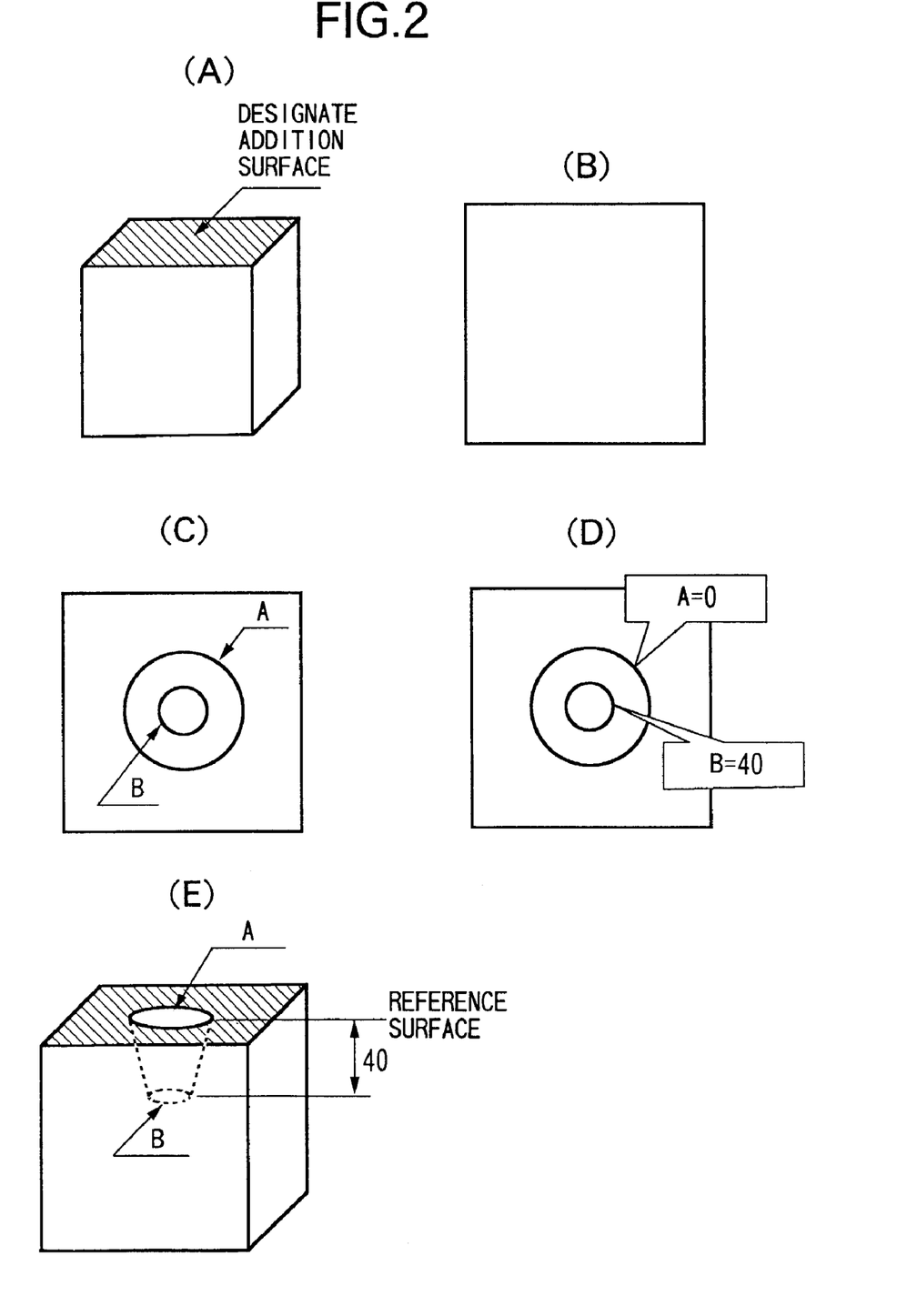
FIG. 2 shows procedures of creating a three-dimensional shape, in which (A) to (E) are diagrams for explaining first to fifth procedures, respectively.

When creating a three-dimensional shape, first, an "addition surface" for adding a feature to a basic feature is designated as shown in (A) of FIG. 2. After the addition surface is designated, as shown in (B) of FIG. 2, various primitives are created for adding a feature to a section taken of the addition surface two-dimensionally. In the following description, it is assumed that a hole in the shape of truncated cone (hereinafter referred to as "the truncated conical hole") is added to the addition surface. Next, as shown in (C) of FIG. 2, a large circle A and a small circle B concentrically arranged are formed on the addition surface. The series of processes shown in (A) to (C) of FIG. 2 are executed by a drawing function provided by the sectional view forming unit 12.

When the forming of sectional view is completed, the large circle A and the small circle B are retrieved as loops making up the section by a loop retrieval function provided by the loop retrieving unit 16B. The thus retrieved loop is desirably notified to the operator by, for example, changing the display color on the screen or displaying a pop-up window prompting the size input. An arbitrary size is input for each loop retrieved by the size input function provided by the size input unit 18, as shown in (D) of FIG. 2. For the size, there may be adopted either an absolute size on the basis of the addition surface or a relative size on the basis of another surface.

When the size input is completed for each loop, each loop is extruded in a predetermined direction by the three-dimensional shape creating function provided by the three-dimensional shape creating unit 20. Then, as shown in (E) of FIG. 2, a three-dimensional shape with a feature added to the basic feature is created and displayed on the screen.

Next, the principle of creating a three-dimensional shape will be explained with reference to specific examples.

Figure 3:
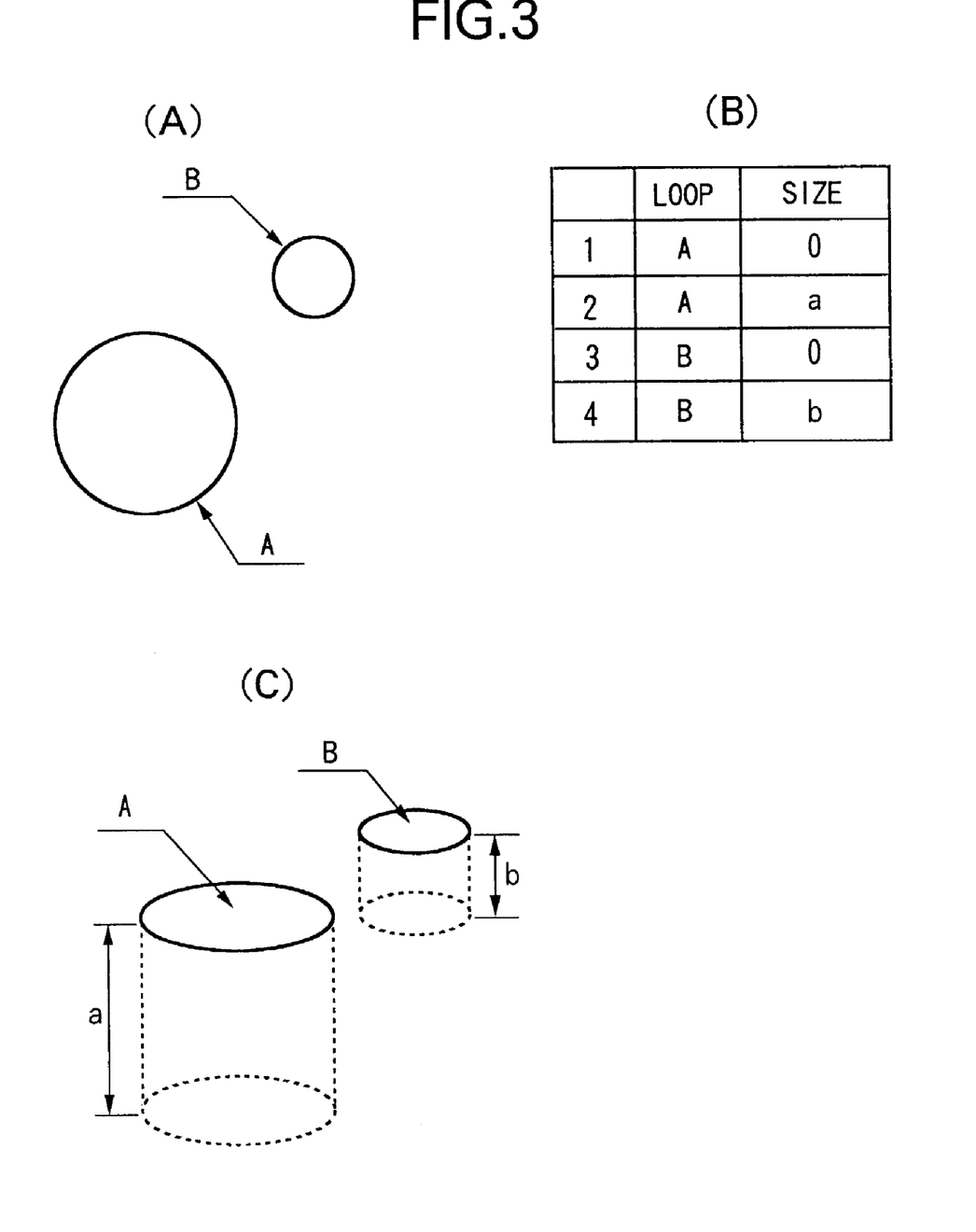
FIG. 3 shows a first example of the principle for creating a three-dimensional shape, in which (A) is a diagram for explaining a section, (B) a diagram for explaining a management table, and (C) a diagram for explaining a three-dimensional shape created.

FIG. 3 shows, as a first example, the principle for adding two holes of different depths to the addition surface. In the addition surface, as shown in (A) of FIG. 3, a large circle A and a small circle B making up a feature are formed. Sizes are input so that the large circle A is extruded by size "a" on the basis of the addition surface, while the small circle B is extruded by size "b" on the basis of the addition surface. Thus, a management table as shown in (B) of FIG. 3 is prepared. Extrusion start positions (items 1 and 3) and extrusion amounts (items 2 and 4) for the respective loops are set in the management table. When the management table is prepared, three-dimensional shapes as shown in (C) of FIG. 3 are created in accordance with the setting contents.

Figure 4:
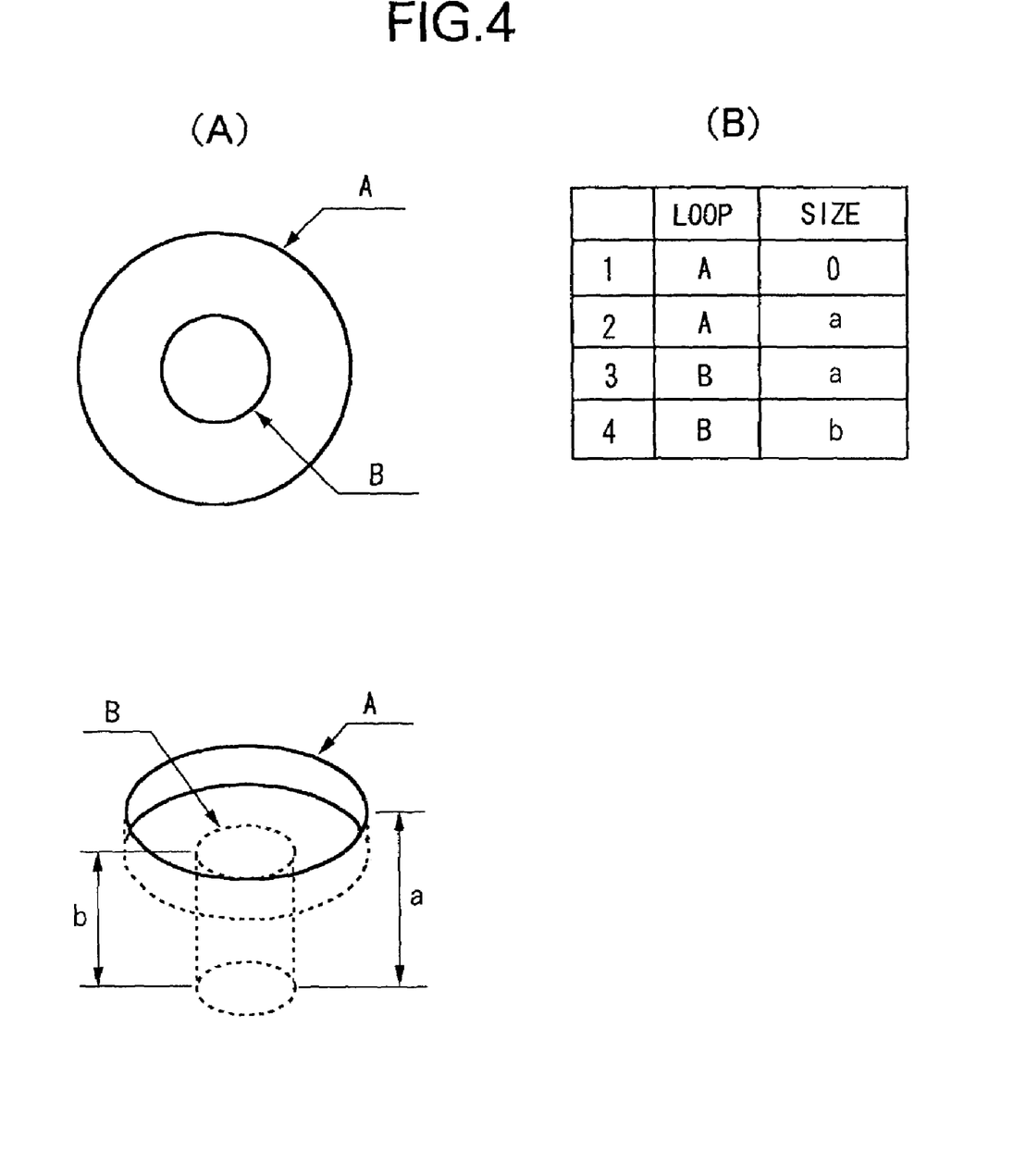
FIG. 4 shows a second example of the principle for creating a three-dimensional shape, in which (A) is a diagram for explaining a section, (B) a diagram for explaining a management table, and (C) a diagram for explaining a three-dimensional shape created.

FIG. 4 shows, as a second example, the principle for adding a tap hole (stepped hole) to the addition surface. A large circle A and a small circle B, which are arranged concentrically and make up a feature, are formed on the addition surface, as shown in (A) of FIG. 4. Sizes are input so that the large circle A is extruded by size "a" on the basis of the addition surface, while the small circle B is extruded by size "b" on the basis of the absolute size "a" (bottom surface of the large hole). Thus, a management table as shown in (B) of FIG. 4 is prepared. When the management table is prepared, three-dimensional shapes as shown in (C) of FIG. 4 is created in accordance with the setting contents.

Figure 5:
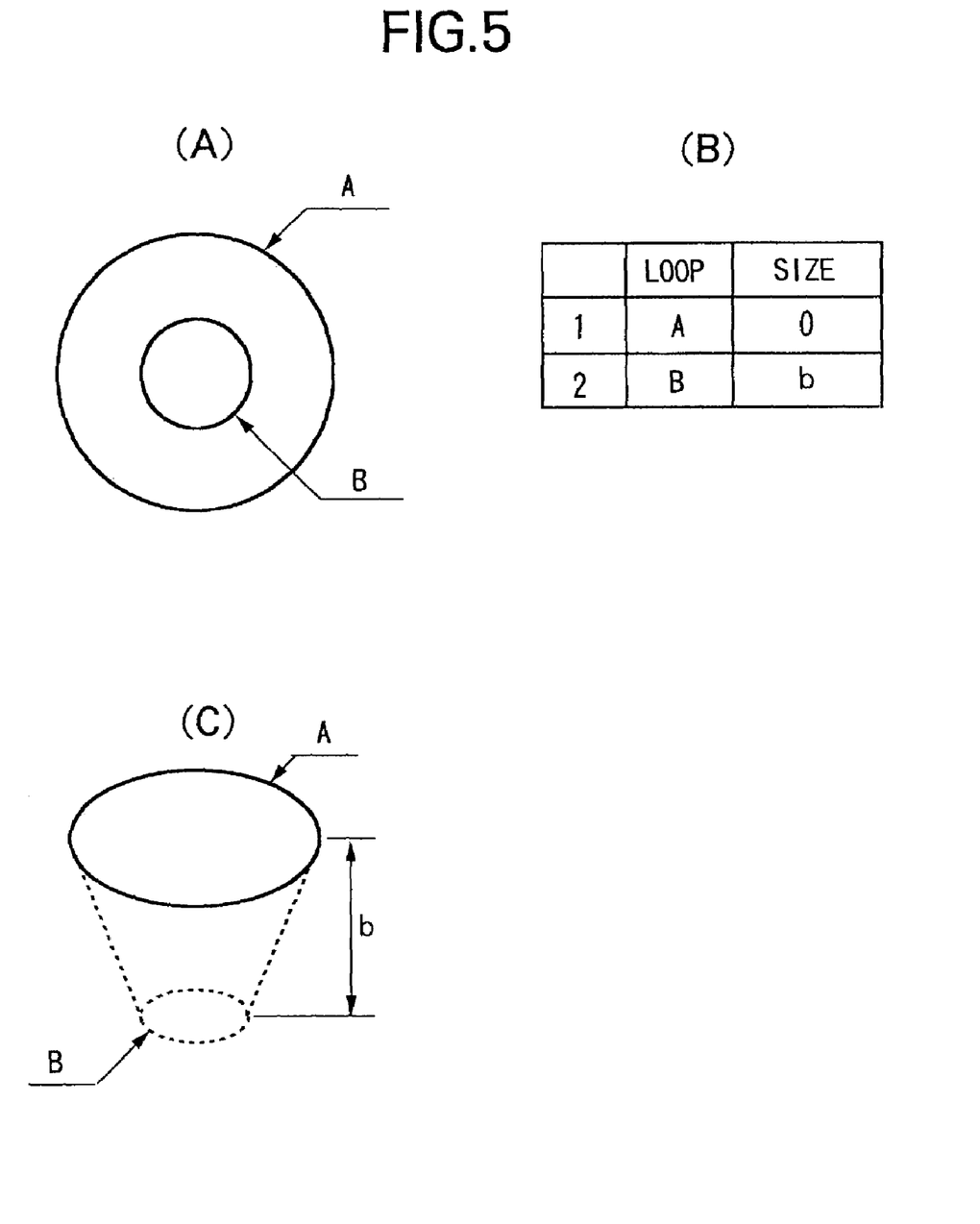
FIG. 5 shows a third example of the principle for creating a three-dimensional shape, in which (A) is a diagram for explaining a section, (B) a diagram for explaining a management table, and (C) a diagram for explaining a three-dimensional shape created.

FIG. 5 shows, as a third example, the principle for adding a truncated conical hole to the addition surface. A large circle A and a small circle B shown in (A) of FIG. 5 are formed on the addition surface. Sizes are input so that the large circle A is extruded by 0 on the basis of the addition surface, while the small circle B is extruded by 0 on the basis of the absolute size "b". Thus, a management table as shown in (B) of FIG. 5 is prepared. Only the extrusion start position of each loop is set in the management table. Namely, in the third example, the extrusion amount for each loop is 0. By omitting the extrusion amounts, therefore, the size of the management table can be reduced. When the management table is prepared, a three-dimensional shape as shown in (C) of FIG. 5 is created in accordance with the setting contents. At this moment, since the extrusion amount is 0 for both the large circle A and the small circle B, a lofting process is executed to connect the contour lines of the two circles.

Figure 6:
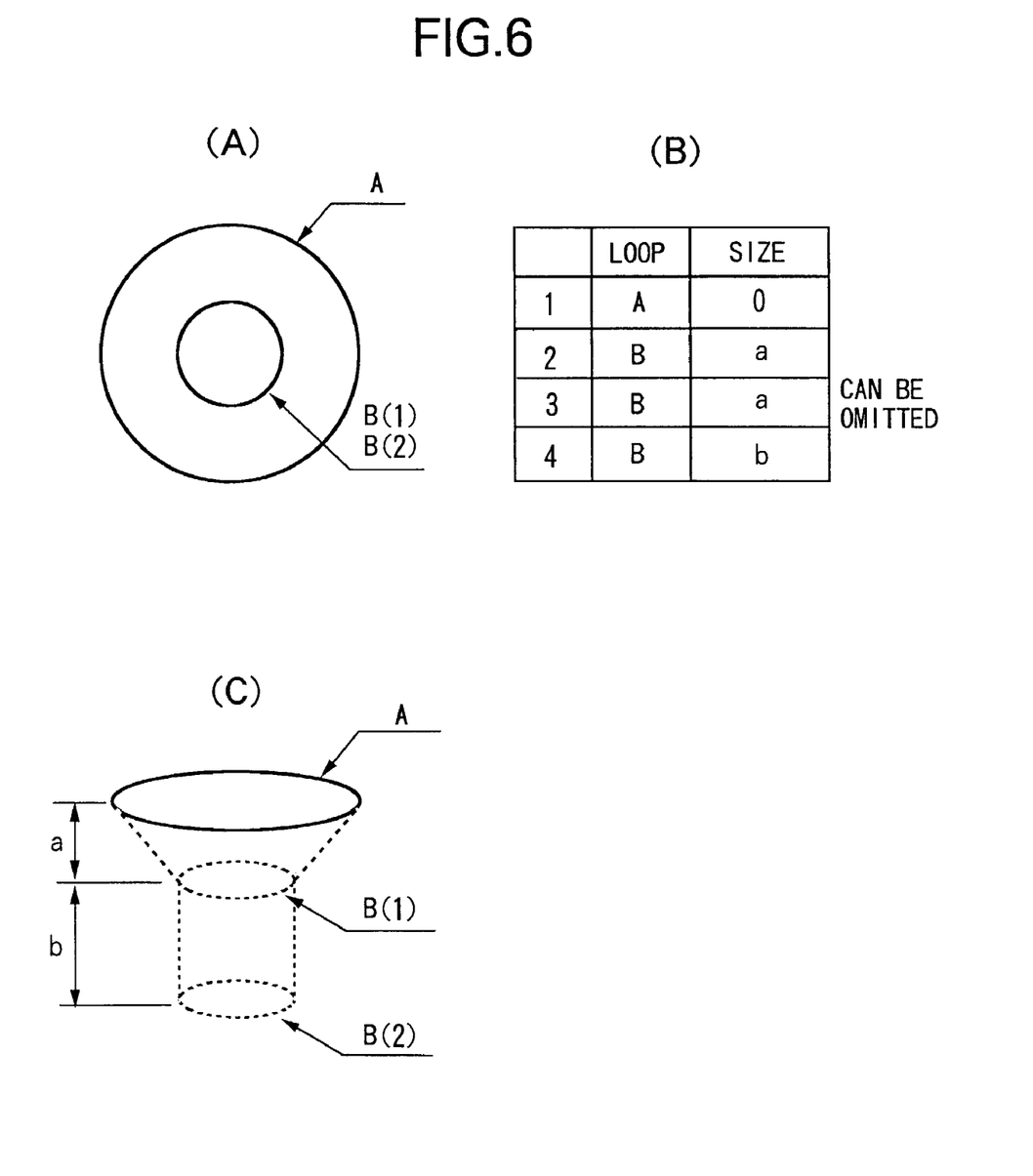
FIG. 6 shows a fourth example of the principle for creating a three-dimensional shape, in which (A) is a diagram for explaining a section, (B) a diagram for explaining a management table, and (C) a diagram for explaining a three-dimensional shape created.

FIG. 6 shows, as a fourth example, the principle for adding a countersink to the addition surface. A large circle A and a small circle B shown in (A) of FIG. 6 are formed on the addition surface. Sizes are input so that the large circle A is extruded by 0 on the basis of the addition surface, while the small B is extruded by 0 on the basis of the absolute size "a" and also by "b" on the basis of the absolute size "a". Thus, a management table as shown in (B) of FIG. 6 is prepared. Namely, the small circle B is handled as it has a plurality of loops B(1) and B(2) so that an arbitrary size may be input for each of the loops B(1) and B(2). When the management table is prepared, three-dimensional shapes as shown in (C) of FIG. 6 is created in accordance with the setting contents. At this moment, since both the large circle A and the small circle B (loop B(1)) have the extrusion amount of zero, the lofting process is executed to connect the contour lines of the circle A and the circle B (loop B(1)), and also the small circle B (loop B(2)) is extruded by size "b" on the basis of the absolute size "a", to thereby create a countersink.

Accordingly, in the second to fourth examples, completely different features can be created by inputting different sizes for the respective loops making up a common section. Therefore, unlike in the prior art, it is not necessary to change exclusive commands each time to create different features, thereby enabling to reduce the number of operations required for creating a three dimensional shape. Also, as in the fourth example, a feature having a plurality of characteristics can be easily created.

In each example, the large circle A and the small circle B make up a feature. In the subsequent editing operations such as deletion and the change of order in creating history, therefore, the object for edition can be easily selected. Further, in each of the examples, no sectional view is used for creating a feature, and therefore a labor for forming such a sectional view is not required.

Figure 7:
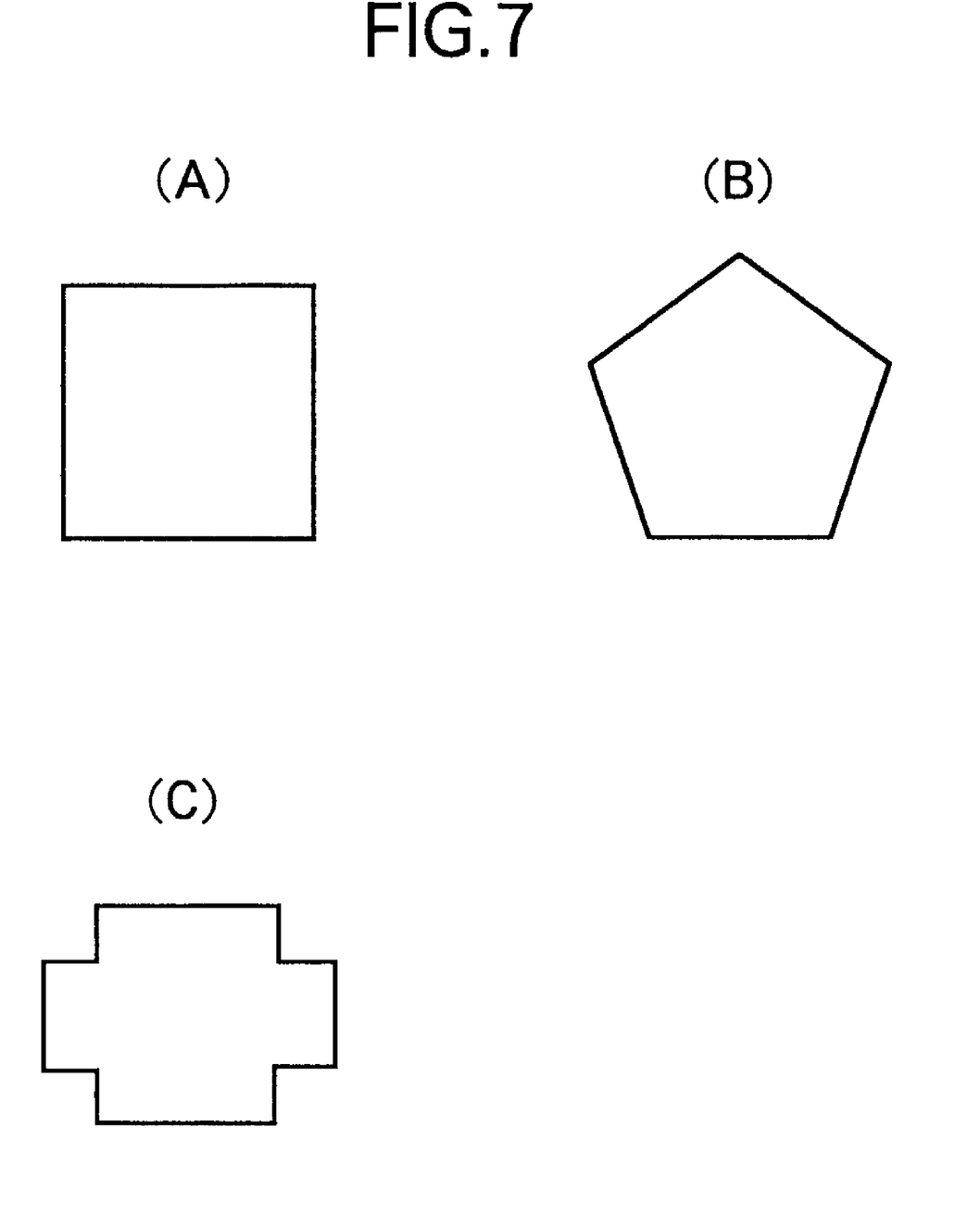
FIG. 7 shows other primitives making up a section, in which (A) to (C) are diagrams for explaining first to third examples, respectively.

In the foregoing description, a circle as a loop has been formed on the addition surface. However, instead, a loop of a rectangle, a pentagon or other shape may be formed as shown in FIG. 7. Also, there has been described as the examples in which a hole is formed as a basic feature, however, instead, a protrusion can be created. Such a three-dimensional figure can be formed, as well known, by arithmetic operations such as a sum of sets or a product set using a plurality of features. The basic features are of course not necessarily required, but a section drawn two-dimensionally and extruded into a stereo object can alternatively be used directly.

The program for realizing these functions is recorded in a computer readable recording medium such as a CD-ROM, DVD-ROM or the like. Thus, the program for creating a three-dimensional shape according to the present invention can be distributed on the market. In this way, a person who has acquired such a recording medium can easily construct a three-dimensional shape creating apparatus according to the present invention by utilizing a general computer system.

What is claimed is:

1. A computer readable medium containing a three-dimensional shape creating program executable on a computer, said program comprising the steps of:
    forming a section including a plurality of loops having contour lines not crossed with one another;
    inputting an arbitrary and independent size for extruding each of said loops in a predetermined direction; and
    creating a three-dimensional shape by extruding each of said loops in the predetermined direction based on only the sizes input by said size input step.

2. The computer readable medium containing the three-dimensional shape creating program according to claim 1, wherein said section includes various primitives for adding one feature with a basic feature as a main.

3. The computer readable medium containing the three-dimensional shape creating program according to claim 1, further comprising a step of;
    retrieving the section formed by said section forming step to notify an operator of each loop making up said section.

4. The computer readable medium containing the three-dimensional shape creating program according to claim 1, wherein when one loop is contained in the other loop and also a size is designated for each loop, said three-dimensional shape creating step includes a step for judging characteristics of the designation and determining how a plurality of the loops are connected into a three-dimensional shape.

5. The computer readable medium containing the three-dimensional shape creating program according to claim 1, wherein when one loop is contained in the other loop and also extrusion amounts of both of the two loops are set to zero, said three-dimensional shape creating step executes a loft process for connecting the contour lines of the two loops.

6. The computer readable medium containing the three-dimensional shape creating program according to claim 1, wherein said size input step inputs an extrusion start position of each loop with respect to a reference surface and an extrusion amount of the loop.

7. The computer readable medium containing the three-dimensional shape creating program according to claim 1, wherein said size input step can input a plurality of sizes for the same loop.

8. A three-dimensional shape creating method comprising the steps of:
    forming a section including a plurality of loops having contour lines not crossed with one another;
    inputting an arbitrary and independent size for extruding each of said loops in a predetermined direction; and
    creating a three-dimensional shape by extruding each of said loops in the predetermined direction based on only the sizes input by said size input step.

9. A three-dimensional shape creating method according to claim 8, wherein said section includes various primitives for adding one feature with a basic feature as a main.

10. A three-dimensional shape creating method according to claim 8, further comprising a step of;
retrieving the section formed by said section forming step to notify an operator of each loop making up said section.

11. A three-dimensional shape creating method according to claim 8, wherein when one loop is contained in the other loop and also a size is designated for each loop, said three-dimensional shape creating step includes a step for judging characteristics of the designation and determining how a plurality of the loops are connected into a three-dimensional shape.

12. A three-dimensional shape creating method according to claim 8, wherein when one loop is contained in the other loop and also extrusion amounts of both of the two loops are set to zero, said three-dimensional shape creating step executes a loft process for connecting the contour lines of the two loops.

13. A three-dimensional shape creating method according to claim 8, wherein said size input step inputs an extrusion start position of each loop with respect to a reference surface and an extrusion amount of the loop.

14. A three-dimensional shape creating method according to claim 8, wherein said size input step can input a plurality of sizes for the same loop.

15. A three-dimensional shape creating apparatus comprising:
section forming means for forming a section including a plurality of loops having contour lines not crossed with one another;
size input means for inputting an arbitrary and independent size for extruding each of said loops in a predetermined direction; and
three-dimensional shape creating means for creating a three-dimensional shape by extruding each of said loops in the predetermined direction based on only the sizes input by said size input means.

* * * * *